Patented Apr. 16, 1929.

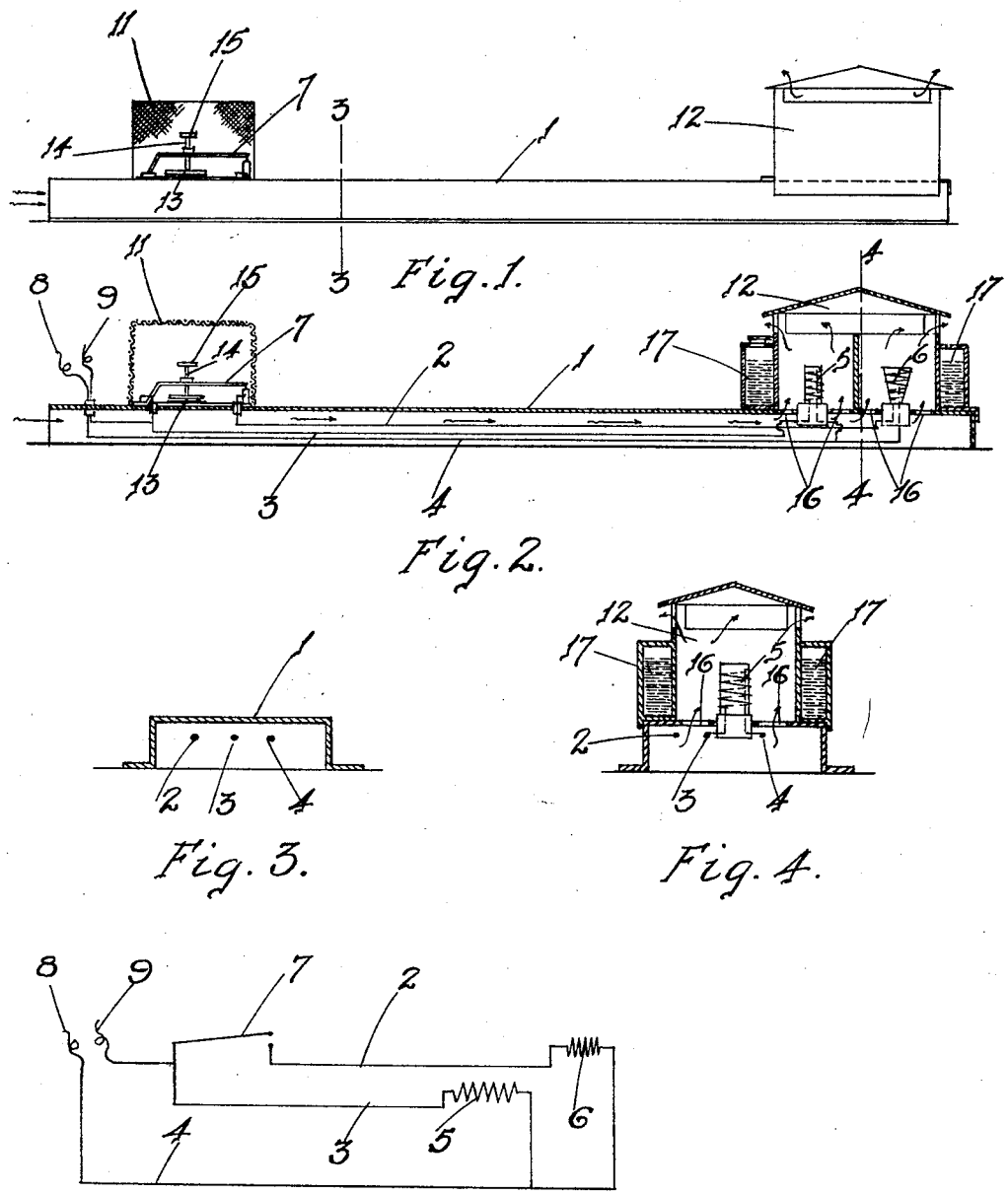

1,709,223

UNITED STATES PATENT OFFICE.

WILLIAM E. LYON, OF SAN DIEGO, CALIFORNIA.

PORTABLE ELECTRIC HEATER.

Application filed March 8, 1928. Serial No. 260,114.

My invention relates to a portable electric heater which is especially adapted to be used for heating the hovers or brooders in which young chicks are kept after being taken from the incubator, and during the time when artificial heat is required to keep them from suffering from the cold, that is automatic in its action; that may be operated from the ordinary electric service wires; and in which the temperature may be kept uniform at all times.

With these objects in view, my invention consists of certain novel features of construction, combination and arrangement of parts as will be hereinafter described in detail, and particularly set forth in the appended claims, reference being had to the accompanying drawings, in which:

Figure 1 is a front elevational view; Fig. 2 is a horizontal sectional view of Fig. 1; Fig. 3 is a sectional view on line 3—3 in Fig. 1; Fig. 4 is a vertical sectional view on line 4—4 in Fig. 2, and Fig. 5 is a detail view of the wiring units of my invention.

Similar characters of reference refer to similar parts throughout the several views of the drawings.

The base member 1 is provided below throughout its entire length with a recess as shown best in Fig. 3. Mounted in this recess are the conducting wires 2, 3 and 4 which provide electric current to the heating units 5 and 6.

An expansive member 13 is mounted on the surface of the member 1 immediately below the thermostatic switch member 7. The thermostatic switch member 7 is provided with a threaded adjusting member 14 which is adapted to be screwed in a threaded hole therein and allow the lower end of the said member 14 to rest on the top of said member 13. The member 14 is provided with a handle means 15 adapted to manually rotate said member 14.

A ventilated cover 12 is placed over the heating units 5 and 6, and it is provided with a surrounding chamber 17 which is adapted to contain water which may be heated from the heating units 5 and 6 so that in case the electric current shall be cut off, heat will continue for a time to be radiated from the heated fluid in said chamber 17.

Surrounding the heating units 5 and 6 are openings 16 which permit the passage of the air from the recess in the member 1 into the chamber provided by the ventilated cover 12 in which the heating units 5 and 6 are located.

The wire 2 is connected with the heating unit 6 and the thermostatic switch 7; the wire 3 is connected with the heating unit 5, and the wire 4 is connected with the heating units 5 and 6 and a current supplying wire 8; a current supplying wire 9 is connected with the wire 3 and thermostatic switch 7 and both wires 8 and 9 are connected, if desired, in the usual manner to an electric current supply source (not shown in the drawings) by means of a cord and socket, or other means as desired.

When the thermostatic switch 7 is open the current from the wire 9 passes along the wire 3 through the heating unit 5, returning through the wires 4 and 8; and when the thermostatic switch 7 is closed (automatically or otherwise) then the current from wire 9 passes through wire 2, thermostatic switch 7, wire 3, heating units 5 and 6, wire 4 and wire 8.

A ventilated cover 11 is placed over the thermostatic switch 7.

In operation the heater is placed where the heat is desired to be used, and connected with the electric supply source, the thermostatic switch is regulated to suit the temperature desired by means of the adjusting means 14.

It will thus be noted that my invention provides an automatically regulated portable heater which is especially adapted for heating brooders and hovers and which may be used generally for heating purposes where a constant temperature is desired to be maintained.

Though I have shown and described a particular construction and arrangement of parts, I do not wish to be limited to this particular construction and arrangement, but desire to include in the scope of my invention the construction, combination and arrangement substantially as set forth in the following claims.

1. A portable electric heater comprising a recessed base member provided with ventilating openings, a plurality of heating units mounted on said base member among said ventilating openings, a ventilated cover mounted on said base member over said heating units and said ventilating openings, an automatic heat control member mounted on said base member and adapted to control one or more of said heating units, and a plurality of electricity conducting wires mounted in the recess of said base member and operatively connected with said heating units, said automatic heat control member and an electric supply source.

2. In a device of the kind described, a recessed base member, a plurality of heating units mounted on said base member, a ventilated cover provided with a reservoir mounted on said base member over said heating units, electric wires mounted in the recess in said base member adapted to electrically connect said heating units with an electric supply source, and an automatic heat control member mounted on said base member adapted to control the electric supply to some of said heating units.

3. A device of the kind described, consisting of a recessed base member provided near one end with a plurality of ventilating openings, a plurality of heating units mounted on said base member among said ventilating openings, a ventilated cover provided with a surrounding reservoir mounted on said base member over said heating units and said ventilating openings, electric wires mounted in the recess in said base member adapted to electrically connect said heating units with an electric supply source, and an automatic heat control member mounted on said base member connected with one of said electric wires adapted to control the electric supply to a predetermined number of said heating units.

4. In a device of the kind described, the combination of a base member provided with a longitudinal recess and a plurality of ventilating openings near one end of a plurality of heating units mounted on said base member among said ventilating openings, an automatic heat control member adapted to control certain of said heating units mounted on said base member operatively connected with the electric wires connected with said heating units, and a plurality of electric wires operatively connected with said heating units and an electric supply source.

WILLIAM E. LYON.